Oct. 27, 1964   B. E. TOMLINSON   3,154,123
FROZEN MATERIAL SHAVING AND MIXING APPARATUS
Original Filed Feb. 24, 1959
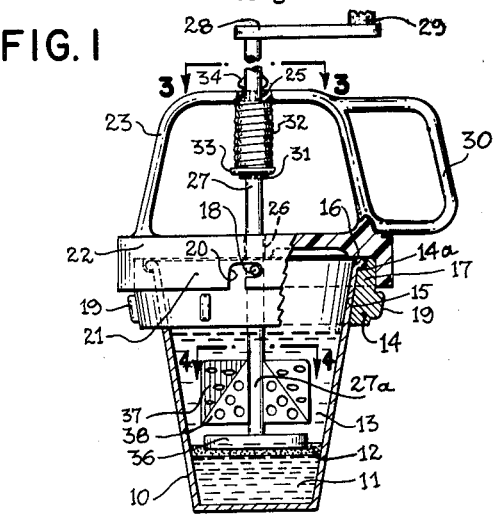
FIG. 1
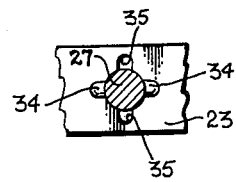
FIG. 3
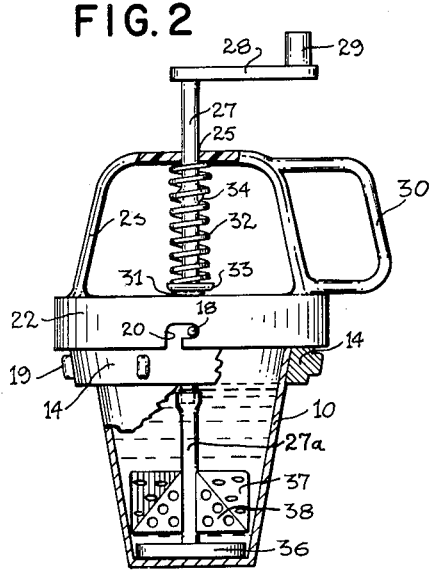
FIG. 2
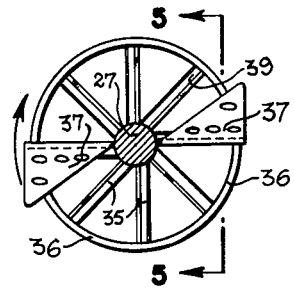
FIG. 4
FIG. 5
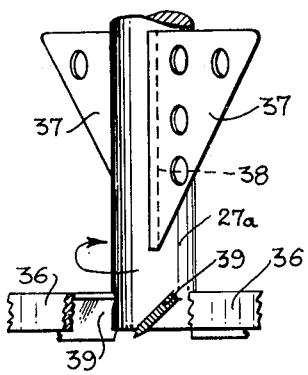
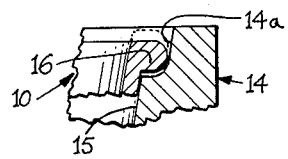
FIG. 6
BARNARD E. TOMLINSON
INVENTOR.
BY Seed & Berry
ATTORNEYS

United States Patent Office 3,154,123
Patented Oct. 27, 1964

3,154,123
FROZEN MATERIAL SHAVING AND MIXING
APPARATUS
Barnard E. Tomlinson, 604 S. 9th Ave.,
Walla Walla, Wash.
Continuation of application Ser. No. 794,917, Feb. 24,
1959. This application Apr. 2, 1963, Ser. No. 270,057
5 Claims. (Cl. 146—68)

The present invention relates to an improved apparatus for making milkshake drinks, and more particularly concerns the shaving and mixing of frozen product at the bottom of a container with flavoring and liquid thereabove. This application is a continuation of my copending application Serial Number 794,917, filed February 24, 1959, now abandoned.

The invention aims to provide a simple process and apparatus of economical construction whereby superior milkshakes can be readily made in a home equipped with refrigerator without need of ice cream as an ingredient and without using an electric mixer.

With yet additional objects and advantages in view which, with the foregoing, will appear and be understood in the course of the following description and claims, the invention consists in the novel adaptation and combination of parts and ingredients hereinafter described.

In the accompanying drawings:

FIG. 1 is an elevational view partly in vertical section of the apparatus of the present invention in operative position on a cup with its spring loaded.

FIG. 2 is a fragmentary elevational view showing the apparatus when the drink is completed.

FIG. 3 is a horizontal sectional view taken as indicated by the line 3—3 of FIG. 1.

FIG. 4 is a horizontal sectional view taken as shown by the line 4—4 of FIG. 1.

FIG. 5 is a fragmentary vertical sectional view taken along the line 5—5 of FIG. 4; and FIG. 6 is a detail view illustrating the seating of the lip of the cup in the recess at the top of the collar.

Referring to the drawings, the numeral 10 has been applied to a standard paper cup or other tapered container commonly used for chilled drinks. Provided at the bottom of this cup is a layer 11 of frozen product which may simply be milk frozen solid in the freezing section of a standard home refrigerator. A layer of flavoring syrup 12 is poured over this frozen product 11 whereup chilled milk 13 is added at the time that the milkshake is to be made.

The function of the apparatus of this invention, to be now described, is to progressively scrape or shave the frozen product 11 and at the same time thoroughly mix the shavings, flavoring and milk together. For mounting the apparatus on the cup 10 I provide a collar 14 which has an inner wall 15 tapered in correspondence to the cup. However, the diameter at the upper larger end of this inner wall is made slightly less than the outside diameter of the cup immediately below the cup's protruding rim or lip 16, so, as will later appear, the upper portion of the cup can be firmly gripped by the collar. In this regard, the upper end of the collar is recessed at 14a to receive the lip 16, but the recess is made deeper than the vertical thickness of the lip as shown in FIGURE 6. It will be noted that the outer wall of the collar has a cylindrical upper portion 17 from which projects a diametrically opposite pair of knobs 18 for bayonet joints. As shown in FIG. 1, the complementing slot portions 20 for these joints are provided in the depending rim 21 of a lid 22 for the cup for ease of manually gripping the collar 14, it is provided with transverse ridges 19 below the clyindrical portion 17.

A bail 23 is rigidly mounted on the lid 22. The closure portion of the lid and the bail are formed with splined through-bores 25–26, respectively, for receiving a mix shaft 27 extending down into the cup and having a threaded coupling with the enlarged head of an agitator extension 27a. A crank 28 with a handle 29 is provided at the top of the shaft 27 for manually turning it. To aid in gripping the lid while applying the same to the collar during turning of the shaft, the bail is formed with a handle 30.

Above said closure portion of the lid the mix shaft caries a projecting cross-pin 31 to serve as a stop for restricting downward travel of the shaft as urged by a compression spring 32. This spring is sleeved on the shaft and seats at the bottom against a cupped washer 33 resting on the pin and at the top against the cross-arm of the bail 23. For locking the spring in a compressed condition the shaft and upper bore 25 are provided with complementing protuberances 34 and grooves 35, respectively. This arrangement permits the shaft to be manually pulled upwardly by its crank in opposition to the spring, with the protuberances 34 alined with the grooves 35 so as to pass therethrough. The spring can then be locked in a loaded position by turning the crank a quarter turn and releasing it thereby seating the protuberances 34 on top of the bail as illustrated in FIG. 3.

At its extreme lower end the mixer shaft has a plurality of radiating blades 39 with coplanar cutting edges at the bottom. These blades may be interconnected at their outer ends by a ring 36 which has its lower edge sharpened and terminating somewhat above the level of the blades' cutting edges as seen in FIG. 5. It is preferred to slope the blades 39 in a common direction of rotation, thirty degrees from the horizontal giving excellent results. The purpose of the blade cant is two-fold, and namely to give a superior shaving action and to present blade area, horizontaly speaking, to resist downward travel of the blades into the frozen layer 11 when so urged by the spring 32.

Spaced somewhat above the blades 39 are a pair of perforated agitating padles or vanes 38 which extend radially somewhat beyond a vertical projection of the ring 36 to follow generally the contour of the cup. These preferably have diverting portions 37 which slope upwardly counter to the proposed direction of rotation, or in other words, in the counter-clockwise direction as viewed from above in the illustrated embodiment. With this arrangement the vanes 38 will impart a generally cycloidal action to the mix to insure thorough mixing thereof above the vanes.

After the cup has been prepared with the charge of frozen product 11 at the bottom and the chilled milk 13 and flavoring 12 has been added the described apparatus is assembled and operated in the following manner. First the collar 14 is inserted over the lower end of the cup and pushed upwardly until the lip 16 is in the recess 14a. At this point the collar is snug on the cup, but the lip is not seated at the bottom of the recess as shown by the broken line position of FIG. 6. Then, after the spring 32 has been loaded as before described and locked with the protuberances 34 seated on the bail out of alinement with the grooves 35, the lid 22 is fitted onto the collar with the mouths of the slots 20 directly over the knobs 18. Thereupon the lid is twisted clockwise to seat the knobs. A screw interfit betwen the lid and collar could of course be used as a substitute for the bayonet joints.

The device is then ready to operate by gripping the collar 14 or the handle 30 in one hand and turning the crank 28 clockwise by its handle 29 with the other hand until the protuberances 34 reach the grooves 35. The mix shaft is then permitted to drop under pressure of the spring 32 until the blades 39 reach the frozen product 11. This pressure seats the cup in the collar without damaging the lip 16 or the recess 14a (see FIG. 6) and as a result the cup cannot turn relative to the collar. Further turning of the crank 28 is continued uninterrupted until the milkshake is completed. While the blades 39 turn with the mix shaft they progressively scrape or shave the frozen base mix to dissect it and the resulting flakes or shavings are thereupon continuously mixed with the liquid thereabove by the action of the agitating vanes 38 which also serve to wipe the sides of the cup. This progressive scraping or shaving occurs because the blades 39 are constantly kept in engagement with the remaining body of frozen product by the action of the spring 32 as the shaft is turned. By the time the blades 39 have moved through the frozen product 11 the drink is complete. In this regard, the stop pin 31 is so located that it will engage the lid 22 before the blades actually touch the bottom wall of the cup. The resulting milkshake is very smooth and has excellent consistency, and yet the entire operation commencing with the application of the collar can normally be performed in only about a minute.

In the above explanation attention has been directed to milkshakes. However, it is to be expressly understood that this invention is also intended to be applicable to the making of other chilled drinks, and frozen desserts as for example, those wherein the frozen product 11 is frozen concentrate. In some instances it may be desired to use a modified agitator in which the vanes 38 have been eliminated.

The advantages of the invention, it is thought, will have been clearly understood from the foregoing detailed description of the embodiment which I have elected to illustrate. Minor changes in the details of construction will suggest themselves and may be resorted to without departing from the spirit of the invention, wherefore it is my intention that no limitations be implied and that the hereto annexed claims be given a scope fully commensurate with the broadest interpretation to which the employed language fairly admits.

What I claim is:

1. A mixing device comprising, a container, a detachable lid for said container, a bail mounted on said lid, a mixer shaft depending through said bail and lid and free to both turn and move lengthwise relative to the bail and lid a distance corresponding to a major part of the length of the container, a crank on said shaft above said bail, spring means seated against said bail and yieldingly urging said shaft downwardly, and shaving and agitating means mounted on said shaft below said lid.

2. A mixing device comprising, a container, a detachable lid for said container, a seat carried by said lid and spaced thereabove a distance corresponding to a major part of the length of said container, said seat and lid having alined bores extending downwardly therethrough, a mixer shaft depending through said bores in said seat and lid and having a stop therebetween for engaging said lid when the bottom of said shaft is adjacent the bottom of the container, said shaft being free to both turn and move lengthwise relative to said lid and seat, shaving and agitating means mounted on said shaft below said lid, a compression spring sleeved on said shaft and confined at its ends by said seat and stop, and means for turning said shaft mounted thereon above said seat.

3. The device of claim 2 in which said shaving and agitating means comprises a ring encircling the lower end of said shaft in radially spaced relation thereto, shaving blades extending radially between said shaft and ring and sloping downwardly in a common circumferential direction, and an agitating vane on said shaft above said blades.

4. The device of claim 3 in which a portion of said vane slopes upwardly in the direction opposite to said common circumferential direction.

5. A mixing device comprising, a container, a detachable lid for said container, a seat carried by said lid and spaced thereabove a distance corresponding to a major part of the length of said container, said seat and lid having alined bores extending downwardly therethrough, a mixer shaft depending through said bores in said seat and lid and having a stop therebetween for engaging said lid when the bottom of said shaft is adjacent the bottom of the container, said shaft being free to both turn and move lengthwise relative to said lid and seat, shaving and agitating means mounted on said shaft below said lid, a compression spring sleeved on said shaft and confined at its ends by said seat and stop, a radial protuberance on said shaft above said stop, the bore in said seat having a groove therealong shaped to pass said protuberance therethrough whereby said shaft can be raised and then turned slightly to lock said spring in a compressed condition, and a crank on the top of said shaft.

References Cited in the file of this patent

UNITED STATES PATENTS

| | | |
|---|---|---|
| 202,600 | Stein | Apr. 16, 1878 |
| 797,079 | Shipplett | Aug. 15, 1905 |
| 1,707,968 | Kieselbach | Apr. 2, 1929 |
| 2,696,370 | Gafford | Dec. 7, 1954 |
| 2,905,449 | Belk et al. | Sept. 22, 1959 |